(12) United States Patent
Suzaki et al.

(10) Patent No.: US 8,306,717 B2
(45) Date of Patent: Nov. 6, 2012

(54) REACTION FORCE APPARATUS

(75) Inventors: Go Suzaki, Utsunomiya (JP); Hirotaka Takiguchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 188 days.

(21) Appl. No.: 12/760,857

(22) Filed: Apr. 15, 2010

(65) Prior Publication Data

US 2010/0274459 A1   Oct. 28, 2010

(30) Foreign Application Priority Data

Apr. 23, 2009   (JP) .................. 2009-105419

(51) Int. Cl.
*B60T 8/32* (2006.01)

(52) U.S. Cl. .............. 701/93; 701/36; 74/513

(58) Field of Classification Search ........... 701/70, 701/78, 79, 83, 93, 94; 74/513
See application file for complete search history.

(56) References Cited

U.S. PATENT DOCUMENTS

| | | | |
|---|---|---|---|
| 5,485,161 A * | 1/1996 | Vaughn .................. 342/357.31 |
| 6,981,486 B2 * | 1/2006 | Yone et al. .................. 123/399 |
| 7,006,917 B2 | 2/2006 | Hijikata | |
| 7,904,246 B2 | 3/2011 | Kondoh et al. | |
| 2004/0059482 A1 * | 3/2004 | Hijikata .................. 701/36 |
| 2004/0259687 A1 | 12/2004 | Ritter et al. | |
| 2005/0056253 A1 | 3/2005 | Yone et al. | |

FOREIGN PATENT DOCUMENTS

| | | |
|---|---|---|
| DE | 102 50 456 A1 | 2/2004 |
| DE | 102 38 484 A1 | 3/2004 |
| EP | 1 749 724 A2 | 2/2007 |
| JP | 2003-260951 | 9/2003 |
| JP | 2004-183633 A | 7/2004 |
| JP | 2006-062453 A | 3/2006 |

* cited by examiner

*Primary Examiner* — John Nguyen
*Assistant Examiner* — Jordan Fei
(74) *Attorney, Agent, or Firm* — Carrier Blackman & Associates, P.C.; Joseph P. Carrier; William D. Blackman

(57) ABSTRACT

When a target vehicle speed setting unit switches from a target vehicle speed to a higher target vehicle speed, a reaction force controller of a reaction force apparatus lowers, at the same ratio, a reaction force applying characteristic, which corresponds to the target vehicle speed before being switched to the higher target vehicle speed.

4 Claims, 7 Drawing Sheets

REACTION FORCE APPARATUS

CROSS-REFERENCE TO RELATED APPLICATION

This application is based upon and claims the benefit of priority from Japanese Patent Application No. 2009-105419 filed on Apr. 23, 2009, of which the contents are incorporated herein by reference.

BACKGROUND OF THE INVENTION

1. Field of the Invention

The present invention relates to a reaction force apparatus for controlling a reaction force that is applied to the accelerator pedal of a vehicle.

2. Description of the Related Art

Technology has been available in the art for applying an additional reaction force from a motor, in addition to the reaction force from a return spring, to the accelerator pedal of a vehicle (see Japanese Laid-Open Patent Publication No. 2003-260951). According to Japanese Laid-Open Patent Publication No. 2003-260951, a relationship between vehicle speed and a drive signal for a rotational motor (2) is prescribed for each threshold speed, and a reaction force generated by the motor (2) is controlled (see FIG. 2, for example). When the threshold speed changes, the relationship between the vehicle speed and the drive signal for the rotational motor (2) also is changed. For example, when the threshold speed increases, the relationship between the vehicle speed and the drive signal for the rotational motor (2) changes in order to generate a reaction force at a higher vehicle speed (see FIG. 2).

According to Japanese Laid-Open Patent Publication No. 2003-260951, as described above, when the threshold speed increases, the relationship between the vehicle speed and the drive signal for the rotational motor (2) changes in order to generate a reaction force at a higher vehicle speed. If the threshold speed increases while the rotational motor (2) is currently generating a reaction force, then the reaction force, which has been generated so far, changes rapidly. Therefore, the driver of the vehicle may possibly feel discomfort when operating an accelerator pedal (1). In addition, if the accelerator pedal (1) is depressed to different depths, then the amount of reaction force, which is reduced when the threshold speed increases, undergoes irregular differences. As a consequence, individual drivers experience different feelings concerning operation of the accelerator pedal (1), and cannot be guided appropriately to depress the accelerator pedal (1). Moreover, if the reaction force is rapidly reduced when the threshold speed increases, then the driver may depress the accelerator pedal (1) excessively, thereby causing the vehicle to accelerate faster than necessary.

SUMMARY OF THE INVENTION

It is an object of the present invention to provide a reaction force apparatus, which is capable of reducing discomfort that a driver of a vehicle feels when operating the accelerator pedal of the vehicle.

Another object of the present invention is to provide a reaction force apparatus, which is capable of guiding the driver of a vehicle appropriately to depress the accelerator pedal of the vehicle.

Still another object of the present invention is to provide a reaction force apparatus, which enables the accelerator pedal of a vehicle to be controlled appropriately.

A reaction force apparatus according to the present invention comprises an actuator for applying a reaction force to an accelerator pedal of a vehicle, a target vehicle speed setting unit for setting target vehicle speeds for the vehicle, and a reaction force controller for setting, for each of respective target vehicle speeds, reaction force applying characteristics according to which the actuator applies reaction forces to the accelerator pedal, and controlling a reaction force to be applied from the actuator to the accelerator pedal depending on an amount of depression of the accelerator pedal or a vehicle speed of the vehicle. When the target vehicle speed setting unit switches from one of the target vehicle speeds to a higher target vehicle speed, the reaction force controller lowers, at the same ratio, one of the reaction force applying characteristics, which corresponds to the target vehicle speed before switching to the higher target vehicle speed.

When the target vehicle speed setting unit switches from one of the target vehicle speeds to a higher target vehicle speed, a reaction force increasing range usually is shifted into a range where the amount of depression of the accelerator pedal is larger, or where the vehicle speed is higher. According to the present invention, when the target vehicle speed setting unit switches from one of the target vehicle speeds to a higher target vehicle speed, the reaction force controller lowers, at the same ratio, one of the reaction force applying characteristics, which corresponds to the target vehicle speed before switching to the higher target vehicle speed. Consequently, even if the driver continues to depress the accelerator pedal with the same depressing force while the target vehicle speed setting unit switches from one of the target vehicle speeds to a higher target vehicle speed, the reduction in the reaction force is lowered. Therefore, the driver can smoothly shift to the reaction force increasing range corresponding to the new target vehicle speed.

The reaction force apparatus may further comprise a vehicle speed detector for detecting the vehicle speed of the vehicle. After the target vehicle speed setting unit switches from the one of the target vehicle speeds to the higher target vehicle speed, the reaction force controller may use one of the reaction force applying characteristics, which corresponds to the higher target vehicle speed, when the vehicle speed becomes equal to the higher target vehicle speed, or when the vehicle speed exceeds a vehicle speed threshold value, which indicates that the vehicle speed is in the neighborhood of the higher target vehicle speed.

When the target vehicle speed setting unit switches from the one of the target vehicle speeds to the higher target vehicle speed, the reaction force controller may set a second vehicle speed threshold value, which is in a neighborhood of the higher target vehicle speed and smaller than the vehicle speed threshold value, for preventing the accelerator pedal from being depressed excessively. Also, when the vehicle speed exceeds the second vehicle speed threshold value, the reaction force controller may increase one of the reaction force applying characteristics, which corresponds to the one of the target vehicle speeds, and use the increased one of the reaction force applying characteristics. Thereafter, when the vehicle speed exceeds the vehicle speed threshold value, the reaction force controller may use the one of the reaction force applying characteristics, which corresponds to the higher target vehicle speed. When the vehicle speed reaches a value in the neighborhood of the higher target vehicle speed, the reaction force applying characteristic, which corresponds to the one of the target vehicle speeds, is increased and the increased reaction force applying characteristic is used. Thereafter, the reaction force applying characteristic, which corresponds to the higher target vehicle speed, is used. As a result, the amount of depression of the accelerator pedal can converge to a value corresponding to the target vehicle speed.

When the target vehicle speed setting unit switches from the one of the target vehicle speeds to the higher target vehicle speed, the reaction force controller may add, to the reaction force applying characteristics, an upper limit value, which is equal to or smaller than the reaction force at a position where the driver of the vehicle held the accelerator pedal before the target vehicle speed setting unit switched from the one of the target vehicle speeds to the higher target vehicle speed. When the target vehicle speed setting unit switches from the one of the target vehicle speeds to the higher target vehicle speed, and after the reaction force has reached the upper limit value, which is equal to or smaller than the reaction force at the position where the driver of the vehicle held the accelerator pedal before the target vehicle speed setting unit switched from the one of the target vehicle speeds to the higher target vehicle speed, the reaction force maintains the upper limit value as long as the driver continues to depress the accelerator pedal with the same depressing force. Therefore, the reaction force remains constant until the reaction force applying characteristic corresponding to the higher target vehicle speed is used. Therefore, a large depressing force is not required, and the reaction force applying characteristic is allowed to change smoothly.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A. Embodiment

Figure 1:
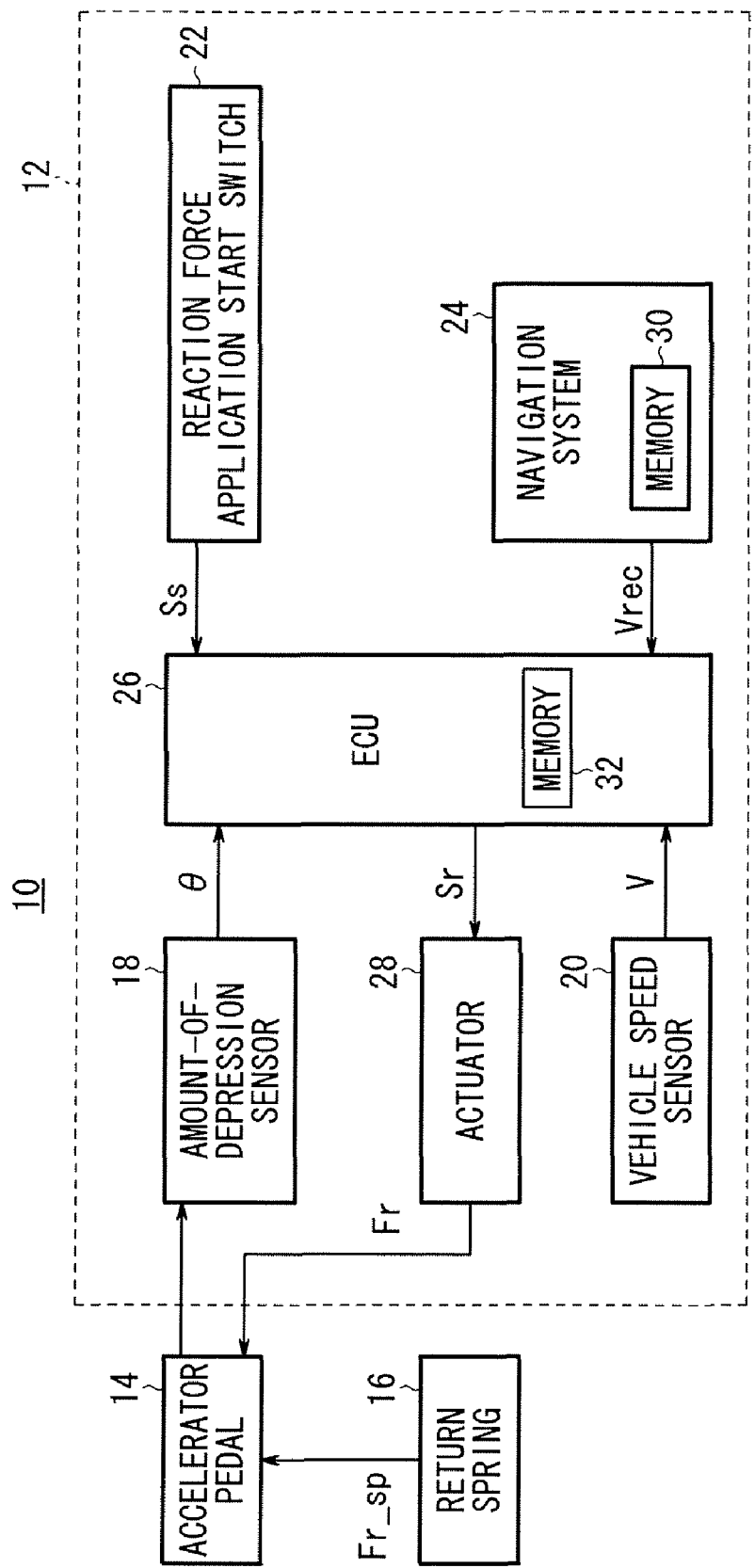
FIG. 1 is a block diagram of a vehicle which incorporates therein a reaction force apparatus according to an embodiment of the present invention.

A vehicle, which incorporates therein a reaction force apparatus according to an embodiment of the present invention, will be described below with reference to the drawings.
1. Arrangement of Vehicle 10:

FIG. 1 is a block diagram of a vehicle 10, which incorporates therein a reaction force apparatus 12 according to an embodiment of the present invention. The vehicle 10 comprises a four-wheeled motor vehicle, for example. The vehicle 10 includes, in addition to the reaction force apparatus 12, an accelerator pedal 14 for controlling an engine, not shown, and a return spring 16 for applying a reaction force Fr_sp [N] to the accelerator pedal 14.

The reaction force apparatus 12 comprises an amount-of-depression sensor 18, a vehicle speed sensor 20, a reaction force application start switch 22, a navigation system 24 (recommended vehicle speed determining unit), an ECU (Electronic Control Unit) 26, and an actuator 28 that actuates the accelerator pedal 14.

The amount-of-depression sensor 18 detects an amount of depression $\theta$ [degrees] of the accelerator pedal 14 from an original position thereof, and outputs the detected amount of depression $\theta$ to the ECU 26. The vehicle speed sensor 20 measures the vehicle speed V [km/hour] of the vehicle 10, and outputs the measured vehicle speed V to the ECU 26.

The reaction force application start switch 22 (hereinafter also referred to as "switch 22") is turned on by the driver of the vehicle 10 in order to instruct the ECU 26 to start applying a reaction force Fr [N] from the actuator 28 to the accelerator pedal 14. More specifically, when the driver turns on the switch 22, the switch 22 sends a reaction force application start signal Ss, which indicates start of the application of the reaction force to the ECU 26. In response to the received reaction force application start signal Ss, the ECU 26 starts to apply the reaction force Fr to the accelerator pedal 14.

The navigation system 24 is capable of detecting the position of the vehicle 10 using GPS (Global Positioning System). The navigation system 24 has a memory 30, which stores information therein concerning recommended vehicle speeds Vrec [km/hour] for various roads. The recommended vehicle speeds Vrec represent vehicle speeds for optimizing mileage of the vehicle 10, depending on road conditions as well as speed limits of the roads. Vehicle speeds for optimizing mileage of the vehicle 10 can be preset based on fuel economy of the vehicle 10, gradients of the roads, the types of roads (paved roads, graveled roads, etc.), or whether the roads have curves or not, etc. The navigation system 24 determines a recommended vehicle speed Vrec depending on the detected position of the vehicle 10, and sends the recommended vehicle speed Vrec to the ECU 26.

The ECU 26 sets a characteristic (reaction force applying characteristic Cfr) by which a reaction force Fr is applied to the accelerator pedal 14 depending on a target vehicle speed Vtar [km/hour], which is a target value for the vehicle speed V, and calculates a reaction force Fr [N] to be applied from the actuator 28 to the accelerator pedal 14 based on the reaction force applying characteristic Cfr and the amount of depression $\theta$. Then, the ECU 26 sends a control signal Sr representative of the calculated reaction force Fr to the actuator 28. The reaction force applying characteristic Cfr, which is stored in a memory 32 of the ECU 26, represents a relationship between the amount of depression $\theta$ and the reaction force Fr for each target vehicle speed Vtar. According to the present embodiment, when the target vehicle speed Vtar increases accompanying an increase in the recommended vehicle speed Vrec, the ECU 26 carries out a target vehicle speed increase-occasioned process (Vtar increase-occasioned process), to be described later, for smoothly changing the reaction force applying characteristic Cfr.

The actuator 28 comprises an electric motor, not shown, connected to the accelerator pedal 14. The actuator 28 applies the reaction force Fr to the accelerator pedal 14, the reaction force Fr being represented by the control signal Sr that is received from the ECU 26. Therefore, the reaction force Fr from the actuator 28 and the reaction force Fr_sp from the return spring 16 both are applied to the accelerator pedal 14.

The actuator 28 may alternatively comprise any of various drive force generating means, e.g., a pneumatic actuator.

2. Vtar Increase-Occasioned Process:

According to the present embodiment, as described above, when the target vehicle speed Vtar increases accompanying an increase in the recommended vehicle speed Vrec, the ECU 26 carries out a target vehicle speed increase-occasioned process (Vtar increase-occasioned process) for smoothly changing the reaction force applying characteristic Cfr. The ECU 26 carries out the Vtar increase-occasioned process only if the target vehicle speed Vtar is increased by or greater than a predetermined threshold value (Vtar increase-occasioned process start determining threshold value THstr). The threshold value THstr, representing 10 km/h for example, serves to determine whether the Vtar increase-occasioned process should be carried out or not. The threshold value THstr is established because if the target vehicle speed Vtar changes only slightly, then the change in the reaction force Fr could possibly make the driver feel uncomfortable.

Figure 2:
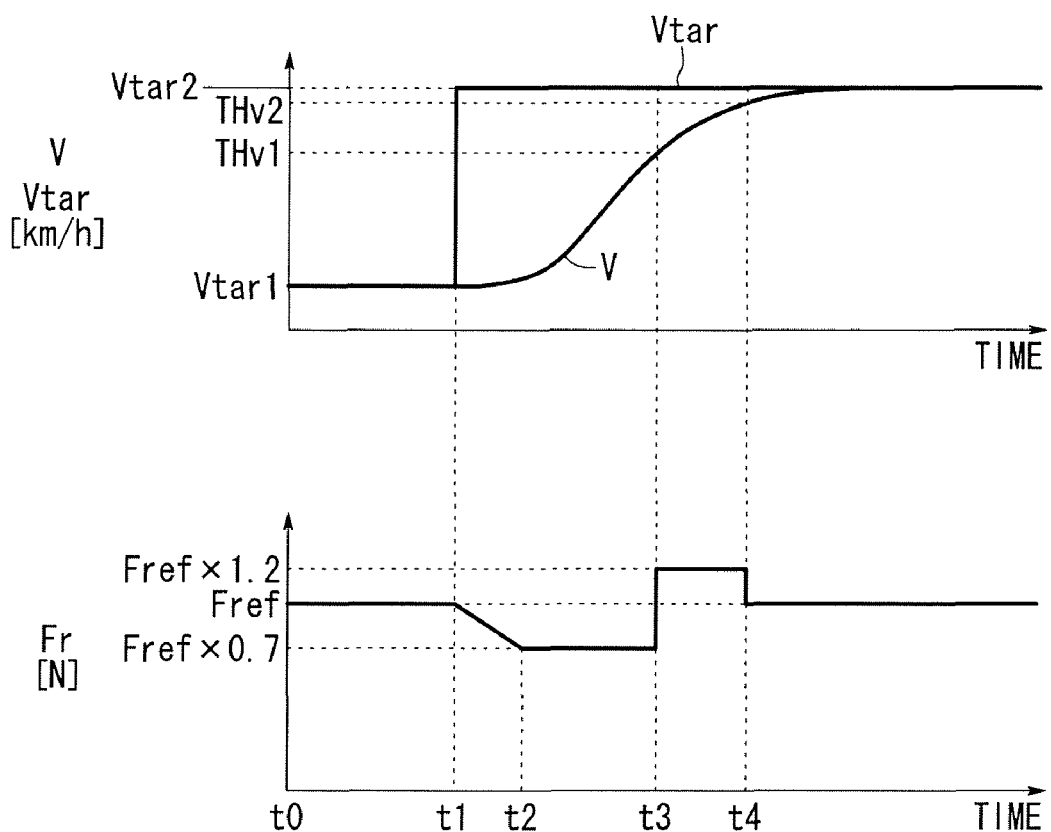
FIG. 2 is a diagram showing the relationship between a vehicle speed, a target vehicle speed, and a reaction force in a target speed increase-occasioned process.
Figure 3:
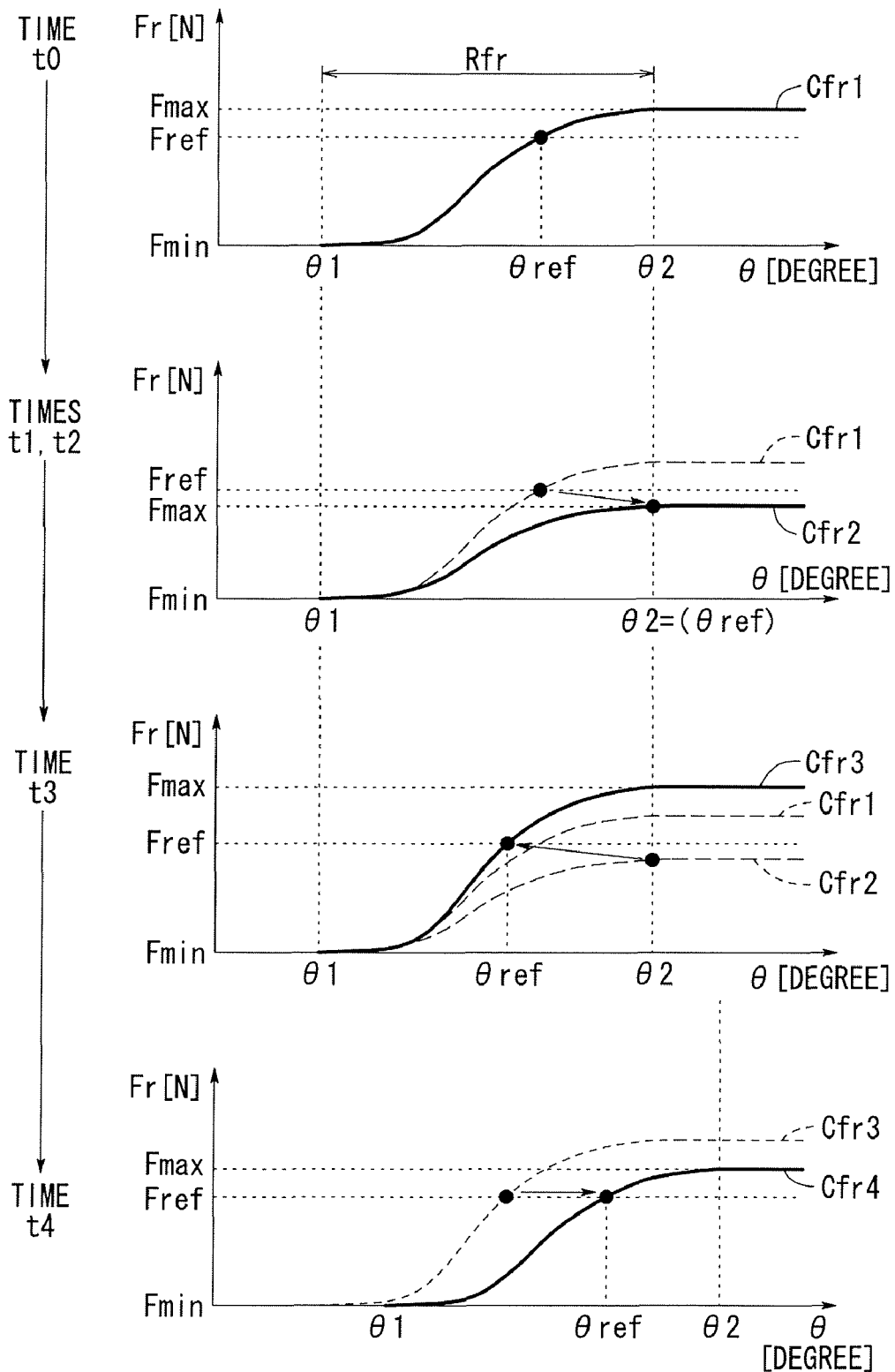
FIG. 3 is a diagram showing a reaction force applying characteristic in the target speed increase-occasioned process.

FIG. 2 is a diagram showing the relationship between vehicle speed V, target vehicle speed Vtar, and the reaction force Fr in the Vtar increase-occasioned process. FIG. 3 is a diagram showing the reaction force applying characteristic Cfr used in the Vtar increase-occasioned process.

First, the reaction force applying characteristic Cfr in the present embodiment will be described below. For illustrative purposes, in FIGS. 2 and 3, the target vehicle speed Vtar from time t0 to time t1 will be referred to as a "target vehicle speed Vtar1", and the target vehicle speed Vtar from time t1 will be referred to as a "target vehicle speed Vtar2". Further, in FIGS. 2 and 3, the reaction force applying characteristic Cfr at time t0 will be referred to as a "reaction force applying characteristic Cfr1", the reaction force applying characteristic Cfr at times t1 and t2 will be referred to as a "reaction force applying characteristic Cfr2", the reaction force applying characteristic Cfr at time t3 will be referred to as a "reaction force applying characteristic Cfr3", and the reaction force applying characteristic Cfr at time t4 will be referred to as a "reaction force applying characteristic Cfr4".

According to the reaction force applying characteristic Cfr1 shown in FIG. 3, the reaction force Fr starts to increase at an amount of depression θ1, and reaches a maximum value Fmax at an amount of depression θ2. The range from the amount of depression θ1 to the amount of depression θ2 is referred to as a "reaction force increasing range Rfr". According to the present embodiment, the amount of depression θ at which the vehicle speed V is in conformity with the target vehicle speed Vtar is referred to as a "reference amount of depression θref", and the reaction force Fr at the reference amount of depression θref is referred to as a "reference reaction force Fref". Stated otherwise, in the example shown in FIGS. 2 and 3, it is assumed that the force of depression applied by the driver is kept at a level equal to the reference reaction force Fref.

As shown in FIG. 2, from time t0 to time t1, the target vehicle speed Vtar is represented by Vtar1, whereas the reaction force applying characteristic Cfr is represented by Cfr1.

At time t1, the target vehicle speed Vtar increases from Vtar1 to Vtar2 (Vtar1<Vtar2), and the reaction force applying characteristic Cfr switches from Cfr1 to Cfr2. The reaction force applying characteristic Cfr2 is represented by the product of 0.7 and the reaction force applying characteristic Cfr1 in its entirety. Since the reaction force applying characteristic Cfr is lowered, it becomes easier for the driver to depress the accelerator pedal 14. However, inasmuch as the reaction force Fr is not reduced to zero, but remains at a small value, any discomfort felt by the driver is relatively small. Since the reaction force applying characteristic Cfr2 is represented by the product of 0.7 and the reaction force applying characteristic Cfr1 in its entirety, the ratio at which the reaction force Fr decreases is 0.7, independently of where the depressed position of the accelerator pedal 14 resides within the reaction force increasing range Rfr. Consequently, the driver experiences the same sensation when depressing the accelerator pedal 14, no matter where the depressed position of the accelerator pedal 14 resides within the reaction force increasing range Rfr.

As shown in FIG. 2, the reaction force Fr gradually decreases from time t1 and reaches a level represented by the product of 0.7 and the reference reaction force Fref at time t2. As shown in FIG. 3, the reaction force applying characteristic Cfr2 has a maximum value Fmax, which is smaller than the reference reaction force Fref. When the driver depresses the accelerator pedal 14 with a depressing force that balances the reference reaction force Fref, the amount of depression θ increases. Accordingly, the vehicle speed V also increases toward the new target vehicle speed Vtar2.

At time t3 in FIG. 2, the vehicle speed V becomes equal to a first vehicle speed threshold value THv1, which prevents the driver from depressing the accelerator pedal 14 excessively. At this time, as shown in FIG. 3, the reaction force applying characteristic Cfr switches from Cfr2 to Cfr3, thereby increasing the reaction force Fr. The reaction force applying characteristic Cfr3 is represented by the product of 1.2 and the reaction force applying characteristic Cfr1. Such an increase in the reaction force Fr indicates to the driver that the vehicle speed V will soon reach the new target vehicle speed Vtar2. Since the reaction force Fr increases to the reference reaction force Fref×1.2, further depression of the accelerator pedal 14 by the driver is braked.

At time t4 in FIG. 2, the vehicle speed V becomes equal to a second vehicle speed threshold value THv2, which is substantially the same as the new target vehicle speed Vtar2. Actually, the second vehicle speed threshold value THv2 is slightly lower than the new target vehicle speed Vtar2. According to the present embodiment, for example, the second vehicle speed threshold value THv2 is represented by a difference between the target vehicle speed Vtar2 and 0.5 km/h (THv2=Vtar2−0.5). At this time, as shown in FIG. 3, the reaction force applying characteristic Cfr switches from Cfr3 to Cfr4, thereby reducing the reaction force Fr. Such a reduction in the reaction force Fr indicates to the driver that the vehicle speed V has reached the new target vehicle speed Vtar2. The reaction force applying characteristic Cfr4 has the same gradient as the reaction force applying characteristic Cfr1, but is shifted therefrom to the right as shown in FIG. 3. In other words, the reaction force increasing range Rfr of the reaction force applying characteristic Cfr4 covers a greater amount of depression θ. The second vehicle speed threshold value THv2 is not exactly equal to, but is slightly lower, than the target vehicle speed Vtar2, because the change in vehicle speed V experiences a small response delay as a result of the change in the amount of depression θ.

Figure 4:
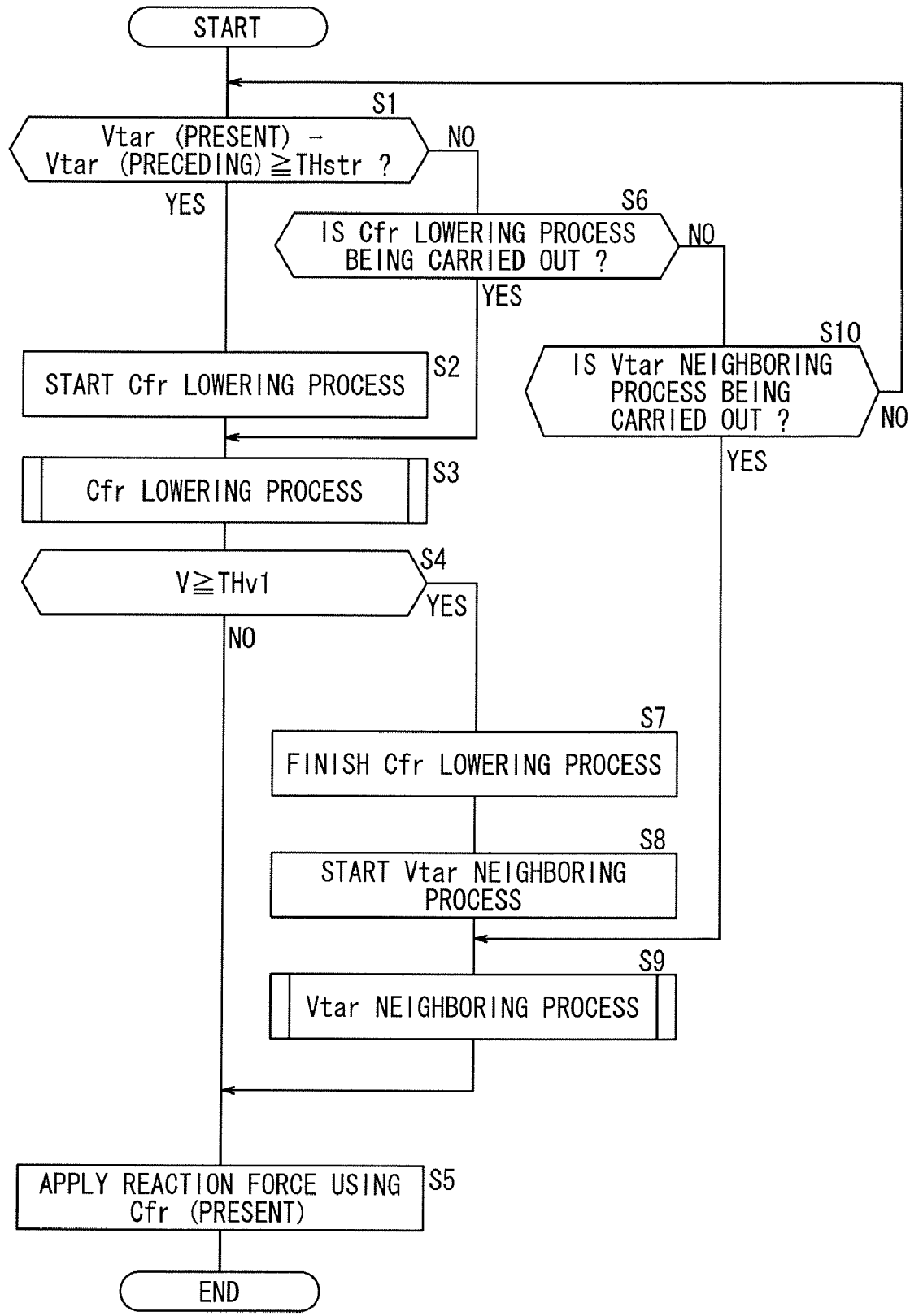
FIG. 4 is a flowchart of the target speed increase-occasioned process.

FIG. 4 is a flowchart of the Vtar increase-occasioned process. In step S1 in FIG. 1, the ECU 26 determines whether or not a target vehicle speed difference ΔVtar, which represents a difference between a present target vehicle speed Vtar (PRESENT) and a preceding target vehicle speed Vtar (PRECEDING), is equal to or greater than the Vtar increase-occasioned process start determining threshold value THstr.

If the target vehicle speed difference ΔVtar is equal to or greater than the threshold value THstr (YES in step S1), then in step S2, the ECU 26 initiates a process to lower the reaction force applying characteristic Cfr (hereinafter referred to as "Cfr lowering process"). More specifically, the ECU 26 turns on a flag for commanding execution of the Cfr lowering process.

In step S3, the ECU 26 executes the Cfr lowering process. According to the present embodiment, the Cfr lowering process uses a reaction force applying characteristic Cfr (OLD), which corresponds to a target vehicle speed Vtar (OLD) before having been switched, and a reaction force applying characteristic Cfr produced by multiplying the reaction force applying characteristic Cfr (OLD) by a coefficient P (0<P<1). More specifically, the reaction force applying characteristic Cfr is lowered by gradually lowering the value of the coefficient P.

Figure 5:
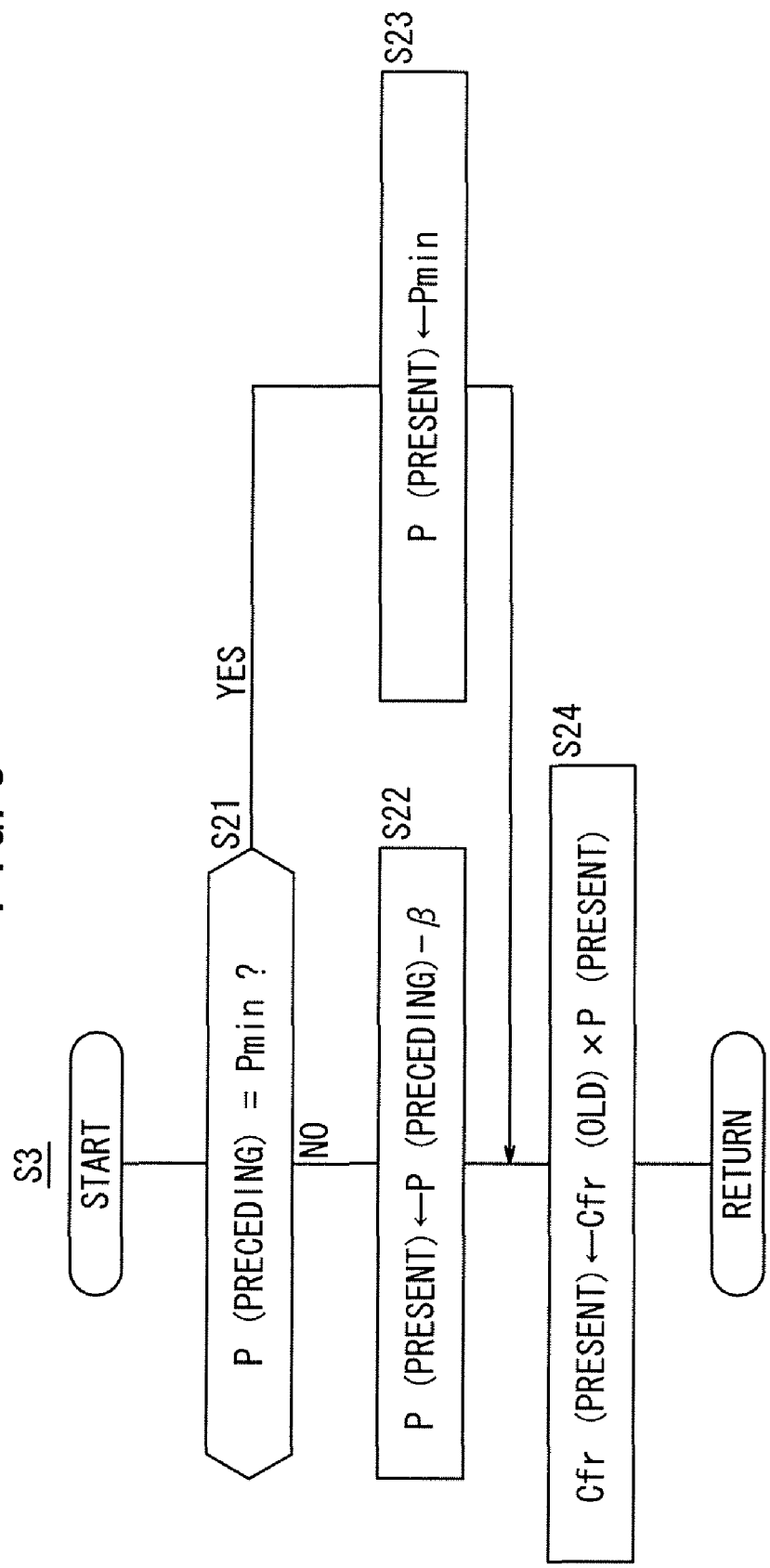
FIG. 5 is a flowchart of a reaction force applying characteristic lowering process.

FIG. 5 is a flowchart of the Cfr lowering process. In step S21 in FIG. 5, the ECU 26 determines whether or not a coefficient P used in the preceding cycle (hereinafter referred to as "coefficient P (PRECEDING)") is equal to a minimum value Pmin (0.7 in the present embodiment) of the coefficient P.

If the coefficient P (PRECEDING) is different from the minimum value Pmin (NO in step S21), then in step S22, the ECU 26 sets a value {P (PRECEDING)−β}, which is produced by subtracting a given value β from the coefficient P (PRECEDING), as a present coefficient P (hereinafter referred to as "coefficient P (PRESENT)"). If the coefficient P (PRECEDING) is equal to the minimum value Pmin (YES in step S21), then in step S23, the ECU 26 sets the minimum value Pmin as the coefficient P (PRESENT). In step S24, the ECU 26 sets the product of the coefficient P (PRESENT), determined in step S22 or S23, and the reaction force applying characteristic Cfr (OLD) as a present reaction force applying characteristic Cfr (hereinafter referred to as "reaction force applying characteristic Cfr (PRESENT)").

In step S4 in FIG. 4, the ECU 26 determines whether or not the vehicle speed V is equal to or higher than the first vehicle speed threshold value THv1. If the vehicle speed V is not equal to or higher than the first vehicle speed threshold value THv1 (NO in step S4), then in step S5, the ECU 26 applies a reactive force Fr according to the reaction force applying characteristic Cfr (PRESENT) determined in step S24 of FIG. 5. Thereafter, control returns to step S1.

After the target vehicle speed Vtar is increased, in step S1, if the difference between the present target vehicle speed Vtar (PRESENT) and the preceding target vehicle speed Vtar (PRECEDING) (the target vehicle speed difference ΔVtar) is not equal to or greater than the threshold value THstr (NO in step S1), then the ECU 26 determines whether or not the Cfr lowering process is currently being carried out in step S6. If the Cfr lowering process is currently being carried out (YES in step S6), then control proceeds to step S3, in which the ECU 26 determines the reaction force applying characteristic Cfr (PRESENT) (step S24 in FIG. 5). If the vehicle speed V is equal to or higher than the first vehicle speed threshold value THv1 (YES in step S4), then it is determined that the vehicle speed V is approaching the new target vehicle speed Vtar (PRESENT). In step S7, the ECU 26 finishes the Cfr lowering process. More specifically, the ECU 26 turns off the flag for commanding execution of the Cfr lowering process.

In step S8, the ECU 26 initiates a process of converging the vehicle speed V to the target vehicle speed Vtar (hereinafter referred to as "Vtar neighboring process"). More specifically, the ECU 26 turns ON a flag for commanding execution of the Vtar neighboring process. In step S9, the ECU 26 executes the Vtar neighboring process.

Figure 6:
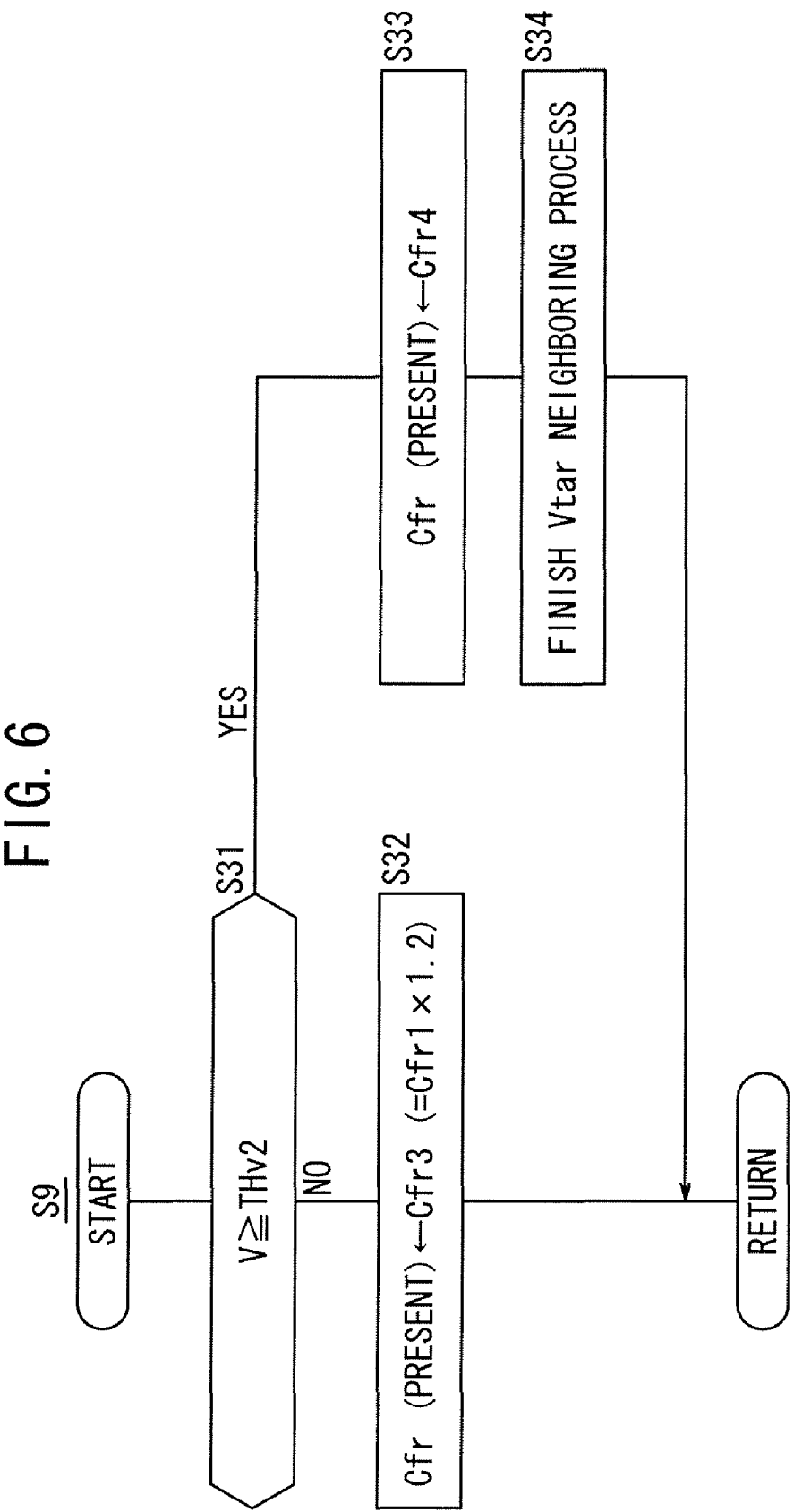
FIG. 6 is a flowchart of a target speed neighboring process.

FIG. 6 is a flowchart of the Vtar neighboring process. In step S31 in FIG. 6, the ECU 26 determines whether or not the vehicle speed V is equal to or higher than the second vehicle speed threshold value THv2. If the vehicle speed V is lower than the second vehicle speed threshold value THv2 (NO in step S31), then, in step S32, the ECU 26 sets the product of 1.2 and the reaction force applying characteristic Cfr1 corresponding to the target vehicle speed Vtar1 before switching thereof (Cfr1×1.2) as the reaction force applying characteristic Cfr (PRESENT). If the vehicle speed V is equal to or higher than the second vehicle speed threshold value THv2 (YES in step S31), then the vehicle speed V will soon reach the new target vehicle speed Vtar. In step S33, the ECU 26 switches from the reaction force applying characteristic Cfr1 to the reaction force applying characteristic Cfr4, and uses the reaction force applying characteristic Cfr4 as the present reaction force applying characteristic Cfr (PRESENT). In step S34, the ECU 26 finishes the Vtar neighboring process.

If the Cfr lowering process is not being carried out (NO in step S6), then the ECU 26 determines whether the Vtar neighboring process is being carried out or not in step S10. If the Vtar neighboring process is being carried out (YES in step S10), then control goes to step S9 in which the ECU 26 executes the Vtar neighboring process. If the Vtar neighboring process is not being carried out (NO in step S10), then control returns to step S1.

3. Advantages of the Present Embodiment:

According to the present embodiment, as described above, when the target vehicle speed Vtar1 switches to a higher value, the reaction force applying characteristic Cfr2 is used, which is lowered from the reaction force applying characteristic Cfr1 corresponding to the target vehicle speed Vtar1 before the target vehicle speed is switched. Thereafter, the reaction force applying characteristic Cfr4, which corresponds to the target vehicle speed Vtar2 switched from the target vehicle speed Vtar1, is used. Therefore, when the target vehicle speed Vtar1 switches to a higher value, further reduction in the reaction force Fr is lowered, even if the driver continues to depress the accelerator pedal 14 with the same depressing force. Consequently, the driver can smoothly shift to the reaction force increasing range Rfr corresponding to the new target vehicle speed Vtar2. In addition, since there is little possibility that the reaction force Fr will drop rapidly, the driver is prevented from depressing the accelerator pedal 14 excessively, and hence the driver can control the accelerator pedal 14 appropriately.

When the target vehicle speed Vtar1 switches to a higher value, the ECU 26 sets the first vehicle speed threshold value THv1 in the neighborhood of the target vehicle speed Vtar2, which was switched from the target vehicle speed Vtar1, for thereby preventing the driver from excessively depressing the accelerator pedal 14. When the vehicle speed V exceeds the first vehicle speed threshold value THv1, the ECU 26 uses the reaction force applying characteristic Cfr3, which is increased from the reaction force applying characteristic Cfr1 corresponding to the target vehicle speed Vtar1 before the target vehicle speed Vtar1 was switched. Thereafter, when the vehicle speed V exceeds the second vehicle speed threshold value THv2, the ECU 26 uses the reaction force applying characteristic Cfr4 corresponding to the target vehicle speed Vtar2, which was switched from the target vehicle speed Vtar1. Accordingly, when the vehicle speed V reaches a value in the neighborhood of the target vehicle speed Vtar2, which was switched from the target vehicle speed Vtar1, the reaction force applying characteristic Cfr3, which is increased from the reaction force applying characteristic Cfr1 corresponding to the target vehicle speed Vtar1 before the target vehicle speed Vtar1 was switched, is used. Thereafter, the reaction force applying characteristic Cfr4 corresponding to the target vehicle speed Vtar2, which was switched from the target vehicle speed Vtar1, is used. As a result, the amount of depression θ of the accelerator pedal 14 can converge to a value corresponding to the target vehicle speed Vtar2.

When the target vehicle speed Vtar1 switches to a higher value, the ECU 26 uses the reaction force applying characteristic Cfr2, which is lowered at the same ratio from the reaction force applying characteristic Cfr1 in its entirety, and which corresponds to the target vehicle speed Vtar1 before the target vehicle speed Vtar1 was switched. Thereafter, the ECU 26 uses the reaction force applying characteristic Cfr4 corresponding to the target vehicle speed Vtar2 switched from the target vehicle speed Vtar1. Since the reaction force applying characteristic Cfr1, which corresponds to the target vehicle speed Vtar1 before the target vehicle speed Vtar1 was switched, is lowered at the same ratio in its entirety, the reactive force is reduced at the same ratio no matter where the depressed position of the accelerator pedal 14 may be, i.e., regardless of the amount of depression θ. Since the rate at which the reactive force Fr is reduced is kept constant independently of the depressed position of the accelerator pedal 14, the feeling that the driver experiences due to the reduction in the reaction force Fr is made uniform. Consequently, the driver is prevented from feeling discomfort due to different degrees at which the reaction force Fr is reduced. Since different individual drivers do not experience different feelings when operating the accelerator pedal 14, drivers are guided appropriately to depress the accelerator pedal 14.

B. Modifications

The present invention is not limited to the above-described embodiment, but various changes and modifications may be made based on the disclosure of the present application. Examples of such changes and modifications will be described below.

In the illustrated embodiment, the reaction force Fr is applied depending on the amount of depression θ. However, the reaction force Fr may be applied depending on the vehicle speed V.

Figure 7:
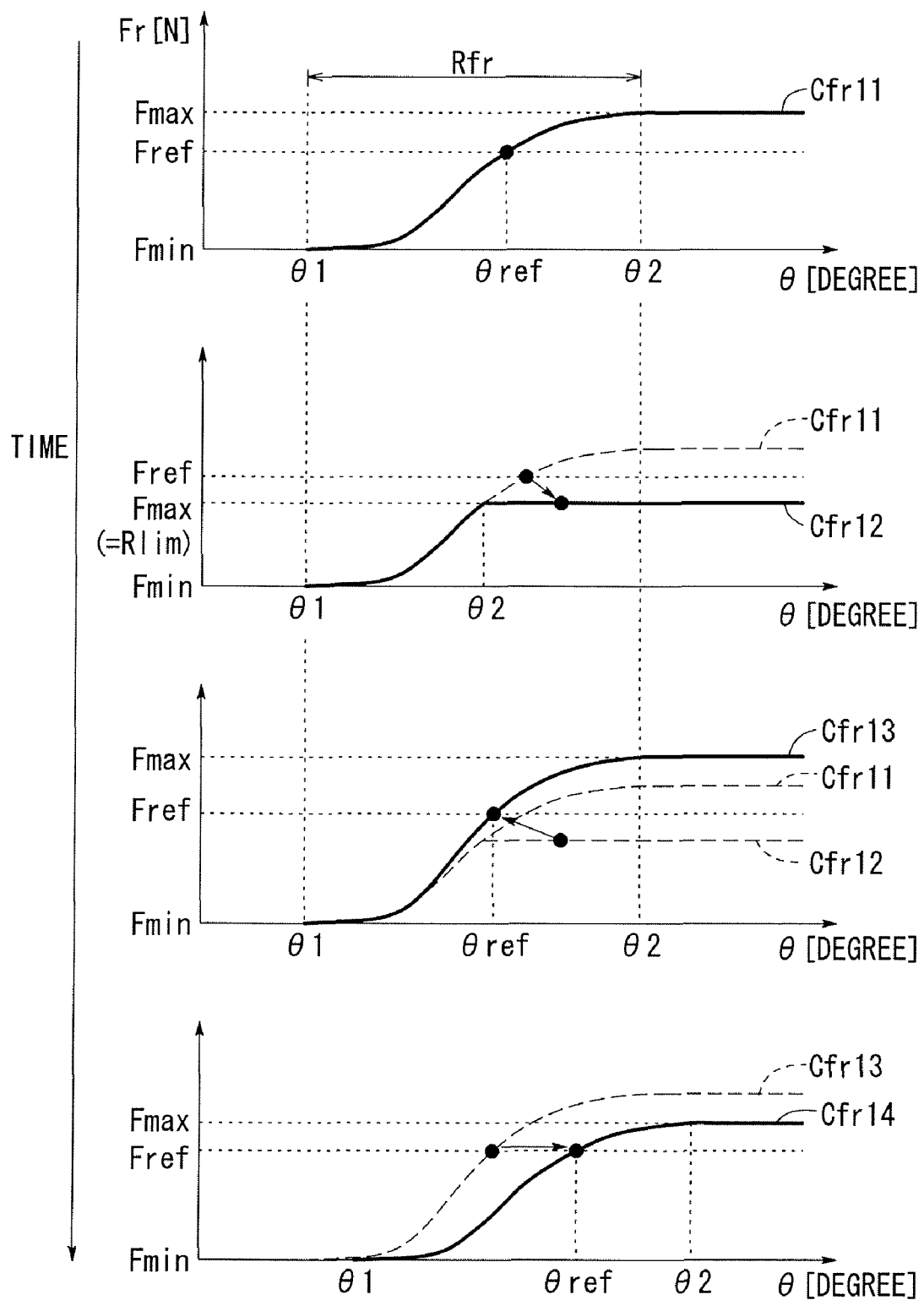
FIG. 7 is a diagram showing a modification of the reaction force applying characteristic shown in FIG. 3.

In the illustrated embodiment, in the Cfr lowering process, the reaction force applying characteristic Cfr1 is lowered at the same ratio in its entirety. However, as shown in FIG. 7, in the Cfr lowering process, a portion of the reaction force applying characteristic Cfr1 may be lowered at a certain ratio, while the reaction force Fr, which depends on the position of the accelerator pedal 14 after the reaction force applying characteristic Cfr1 is lowered, may be set to an upper limit value Rlim (the maximum value Fmax of the reaction force applying characteristic Cfr12 shown in FIG. 7). After the reaction force applying characteristic Cfr1 has been lowered, the reaction force Fr is not lowered, but is maintained at the upper limit value Rlim. Therefore, the reaction force Fr remains constant until the reaction force applying characteristic Cfr3 is used, thereby allowing the reaction force applying characteristic Cfr to change smoothly. Since a portion of the reaction force applying characteristic Cfr1 is lowered at a certain ratio, a reaction force applying characteristic Cfr11 is used as is, at the position to which the depressed position of the accelerator pedal 14 returns from the position where the upper limit value Rlim was produced. Therefore, when the accelerator pedal 14 is returned for some reason when the target vehicle speed Vtar is changed, the driver does not feel any discomfort.

In the above embodiment, in the Vtar neighboring process, the product of 1.2 and the reaction force applying characteristic Cfr1 is used as the reaction force applying characteristic Cfr3. However, a value which is higher than the reaction force applying characteristic Cfr2 in the Cfr lowering process, e.g., the reaction force applying characteristic Cfr1 itself or a reaction force applying characteristic higher than the reaction force applying characteristic Cfr2, may be used as the reaction force applying characteristic Cfr3, in order to cause the driver to recognize that the vehicle speed V is approaching the target vehicle speed Vtar.

According to the above embodiment, in FIG. 3, only the reaction force Fr generated by the actuator 28 is taken into account. However, the reaction force Fr_sp of the return spring 16 may also be taken into account. Generally, the reaction force Fr_sp of the return spring 16 increases as the amount of depression θ becomes greater. In FIG. 3, after the reaction force Fr has reached the maximum value Fmax, the maximum value Fmax is maintained. When the amount of depression θ increases, in view of the fact that the reaction force Fr_sp of the return spring 16 also increases, the reaction force Fr is reduced. The sum of the reaction force Fr and the reaction force Fr_sp is controlled so as to remain unchanged, or a rate of increase in the sum of the reaction force Fr and the reaction force Fr_sp is controlled such that the rate of increase is reduced.

In the above embodiment, recommended vehicle speeds Vrec are acquired from the navigation system 24. However, such recommended vehicle speeds Vrec may be acquired via wireless communications from a source outside of the vehicle 10. Alternatively, the ECU 26 may calculate the recommended vehicle speeds Vrec.

Although a certain preferred embodiment of the present invention has been shown and described in detail, it should be understood that various changes and modifications may be made to the embodiment without departing from the scope of the invention as set forth in the appended claims.

What is claimed is:

1. A reaction force apparatus comprising:
an actuator for applying a reaction force to an accelerator pedal of a vehicle;
a vehicle speed sensor for determining a current vehicle speed;
a recommended vehicle speed determining unit for determining a recommended vehicle speed comprising a memory, wherein the memory stores information concerning recommended vehicle speeds, and wherein the recommended vehicle speed determining unit determines a recommend vehicle speed based on the information stored in the memory;
a target vehicle speed setting unit for setting a target vehicle speed as the recommended vehicle speed when the recommended vehicle speed is higher than the target vehicle speed; and
a reaction force controller that sets, for each of respective target vehicle speeds, reaction force applying characteristics according to which the actuator applies reaction forces to the accelerator pedal,
wherein the reaction force applying characteristics represent a relationship between an amount of depression of the accelerator pedal and the reaction force such that the reaction force is lowered at the same ratio at any amounts of depression, and
wherein the ratio corresponds to the ratio of the target vehicle speeds before and after the setting of the target vehicle speed to the recommended vehicle speed by the target vehicle speed setting unit.

2. A reaction force apparatus according to claim 1,
wherein after the target vehicle speed setting unit switches from the one of the target vehicle speeds to the higher target vehicle speed, the reaction force controller uses one of the reaction force applying characteristics, which corresponds to the higher target vehicle speed, when the vehicle speed becomes equal to the higher target vehicle speed, or when the vehicle speed exceeds a vehicle speed threshold value, which indicates that the vehicle speed is in the neighborhood of the higher target vehicle speed.

3. A reaction force apparatus according to claim 2, wherein, when the target vehicle speed setting unit switches from the one of the target vehicle speeds to the higher target vehicle speed, the reaction force controller sets a second vehicle speed threshold value, which is in a neighborhood of the higher target vehicle speed and smaller than the vehicle speed threshold value, for preventing the accelerator pedal from being depressed excessively; and when the vehicle speed exceeds the second vehicle speed threshold value, the reaction force controller increases one of the reaction force applying characteristics, which corresponds to the one of the target vehicle speeds, and uses the increased one of the reaction force applying characteristics, and thereafter, when the vehicle speed exceeds the vehicle speed threshold value, the reaction force controller uses the one of the reaction force applying characteristics, which corresponds to the higher target vehicle speed.

4. A reaction force apparatus according to claim 1, wherein when the target vehicle speed setting unit switches from the one of the target vehicle speeds to the higher target vehicle speed, the reaction force controller adds, to the reaction force applying characteristics, an upper limit value, which is equal to or smaller than the reaction force at a position where the driver of the vehicle held the accelerator pedal before the target vehicle speed setting unit switched from the one of the target vehicle speeds to the higher target vehicle speed.

* * * * *